United States Patent

Reeder et al.

[15] 3,707,692
[45] Dec. 26, 1972

[54] METHOD OF TREATING CELLULOSIC MATERIAL TO IMPROVE THE USEFULNESS THEREOF AS AN INSULATOR IN ELECTRICAL APPARATUS

[72] Inventors: William R. Reeder, South Milwaukee; Fred S. Sadler, Racine, both of Wis.

[73] Assignee: McGraw-Edison Company, Milwaukee, Wis.

[22] Filed: March 10, 1969

[21] Appl. No.: 805,809

[52] U.S. Cl. ..................336/94, 8/116.2, 8/116.3, 174/17, 252/63.7, 260/29.4 R, 260/29.1 R, 260/231 A, 317/259, 336/206, 336/209
[51] Int. Cl.....H01f 27/32, H01f 27/00, D06m 15/54
[58] Field of Search ............260/29.4, 231; 252/63.7; 8/116.3, 116.2; 174/17; 317/259; 336/94, 206, 209

[56] References Cited

UNITED STATES PATENTS

| | | |
|---|---|---|
| 3,181,927 | 5/1965 | Roth et al.............................8/116.3 |
| 3,224,902 | 12/1965 | Sadler et al..........................8/116.2 |
| 3,211,516 | 12/1965 | Sadler ...................................8/116.2 |
| 3,381,310 | 5/1968 | Tesoro et al..........................8/116.3 |
| 3,427,121 | 2/1969 | Frick et al. ...........................8/116.3 |
| 3,434,794 | 3/1969 | Tovey....................................8/116.3 |
| 3,553,728 | 10/1970 | Shippee et al........................8/116.3 |

OTHER PUBLICATIONS

Gagliardi et al., Textile Research Journal, Vol. 31, pp. 316–327 (1961)
Valko et al., Textile Research Journal, Vol. 32, pp. 331–337
Gonzales et al., American Dyestuff Reporter, Sept. 13, 1965, pp. 74 and 105–108

Primary Examiner—George F. Lesmes
Assistant Examiner—J. Cannon
Attorney—Andrus, Sceales, Starke & Sawall

[57] ABSTRACT

A method of increasing the dimensional stability of cellulosic material by impregnating the cellulose with a composition including a cellulose swelling agent and a compound capable of crosslinking with the cellulose molecules. The swelling agent is capable of swelling the cellulose beyond its full water swollen condition and the crosslinking compound crosslinks with the cellulose molecules to thereby reduce the number of potential water absorbing sites and render the cellulose more dimensionally stable.

The cross-linking takes place at elevated temperatures in the absence of an acidic catalyst and the cross-linked cellulosic materials are useful as insulators in electrical apparatus. Aminoplasts may be used as cross-linkers and, among others, nitrogen containing compounds such as dimethyl formamide and various amines may be used as swelling agents.

4 Claims, No Drawings

METHOD OF TREATING CELLULOSIC MATERIAL TO IMPROVE THE USEFULNESS THEREOF AS AN INSULATOR IN ELECTRICAL APPARATUS

The present invention is directed to a method of increasing the dimensional stability of cellulosic materials, and more particularly to a method of increasing the dimensional stability of cellulose pressboard used as insulation in electrical equipment, such as power transformers.

A major concern in the manufacture of power transformers has been the dimensional changes which occur in cellulose insulation pressboard. Cellulose is very hygroscopic and day-by-day changes in relative humidity within the plant tend to cause warping of the pressboard, thereby increasing the labor cost and assembly of the transformers. Furthermore, the present trend is to manufacture power transformers of greater voltage rating, while decreasing the weight and size. This make the dimensional stabilization of cellulose pressboard even more critical.

In the past attempts have been made to improve the dimensional stability of pressboard by impregnating the pressboard with various additives or impregnants. There are several requirements of an acceptable additive for increasing the dimensional stability of cellulosic materials such as pressboard insulation. The additive should be compatible with the components of the transformer and should not decrease the oil impregnation of the pressboard. Moreover, any additive employed to increase the dimensional stability of the pressboard should not provide a loss in either physical or electrical properties of the pressboard and should not provide any increase in sludge formation.

The present invention is directed to a method of increasing the dimensional stability of cellulosic materials, such as insulation pressboard, by impregnating the cellulose with a composition which includes a cellulose swelling agent and a compound capable of crosslinking with the cellulose molecules. The swelling agent serves to provide intracrystalline swelling of the cellulose, beyond its water swollen condition, and by virtue of this swelling action more reactive sites on the cellulose molecule are exposed for reaction with the crosslinking agent. The resulting product, after crosslinking, has high dimensional stability, meaning that the dimensions of the cellulose material will not increase to any great extent when exposed to high relative humidity or moisture conditions. Moreover, the treating composition will not effect the oil impregnation characteristics of the pressboard and will not contaminate the oil. The composition also improves the thermal stability of the pressboard and the dielectric breakdown strength.

The swelling agents to be employed in the composition are compounds which are capable of swelling the cellulose beyond its full water swollen condition. The swelling agent forms swelling compounds or crystalline addition compounds with the anhydroglucose groups of the cellulose molecule resulting in intracrystalline swelling of the cellulose lattice. The swelling compounds are generally believed to be formed as a result of reaction of the secondary valence bonds, usually of the O—H—O or N—H—O type, with the polar groups of the cellulose molecule. It is believed that the swelling agent acts primarily to expose or reveal more hydroxyl sites on the cellulose molecule for subsequent reaction with the crosslinking agent, and also as a catalyst for the reaction between the crosslinking agent and the cellulose.

Swelling agents which can be employed are generally amines such as N,N-dimethyl formamide; thiourea; resorcinol; alkylamines such as methylamine, ethylamine and propylamine; hydrazine; ethylenediamine; and tetra methylenediamine. Alkylamines containing from four to seven carbon atoms in alkyl groups, such as n-butylamine and n-heptylamine, can also be used if the cellulose is initially pre-swollen with the above mentioned lower alkylamines. In addition, other compounds such as chloralhydrate and benzene sulfonates can also be employed as the swelling agents.

The crosslinking compound is a monomer or partial polymer capable of reacting with the hydroxyl groups of the cellulose molecule. By reacting the hydroxyl groups with the crosslinking agent the number of water absorbing sites on the cellulose molecule is reduced, thereby decreasing the tendency for the cellulose to absorb moisture and increase its dimensions when subjected to high humidity conditions. The crosslinking agent can take the form of dimethylolethylene urea; dihydroxyethylene urea; dimethylolpropylene urea; melamine-formaldehyde; urea-formaldehyde; and the like.

The swelling agent and crosslinking compound are preferably applied to the cellulose material in the form of a solution with water being the preferred solvent. Other solvents or carriers can be employed but water is preferred because it is inexpensive and readily available. The percentage of the water, or other carrier, in the treating solution or suspension is not critical and can vary within wide limits. For most applications, the treating solution will contain from 9.0 to 100 percent of active ingredients. It is possible to employ 100 percent concentrations of the swelling agent and the crosslinking compound, but from a practical standpoint this is not preferred and is considerably more expensive than utilizing solutions, such as a water solution.

Regardless of the manner by which the active ingredients are applied to the cellulose, the combined weight of the swelling agent and the crosslinking compound, based on 100 percent concentrations, should be at least 3.7 percent by weight of the dry cellulose to provide effective results.

The proportion of the swelling agent to the crosslinking compound can also vary within wide limits, but for most purposes the swelling agent is employed in a weight ratio of 33:1 to 1:10 with respect to the crosslinking agent, based on 100 percent concentrations.

The cellulosic material, such as Kraft pressboard, is impregnated with the treat composition by any desired method, such as dipping, brushing, spraying, or the like. As an example, when existing pressboard having a thickness of about 125 mils is immersed in a treating solution, for a period of about one-half to 20 minutes, the solution will penetrate about 12 mils on each surface of the pressboard. On the other hand, the cellulose fibers can be impregnated with the treating solution at the time of manufacture of the pressboard and in that case the treating composition will be impregnated throughout the entire thickness of the pressboard.

After the pressboard or other cellulosic material has been impregnated with the treating solution the pressboard is usually air dried to evaporate the water or other carrier and subsequently heated to a temperature in the range of 245° to 500° F. and held at this temperature for 0.5 to 144 minutes to accelerate the crosslinking. In some instances, the treated cellulose can be immediately heated or baked, without air drying, and the heating will perform the dual function of evaporating the carrier and accelerating the crosslinking reaction.

While it is preferred to impregnate the cellulosic material with a treating composition containing both the swelling agent and the crosslinking compound, the cellulose can be treated separately with the individual ingredients. For example, the cellulose can be initially treated with the swelling agent followed by treatment with the crosslinking compound, or alternately, the cellulose can be initially treated with the crosslinking compound and subsequently treated with the swelling agent. In this latter situation, the initial treatment with the crosslinking compound will produce a crosslinking reaction between the crosslinking compound and the exposed hydroxyl groups on the cellulose molecules. The subsequent treatment with the swelling agent will expose additional reaction sites on the cellulose molecules and the excess crosslinking compound present in the cellulose structure will then react with the newly exposed reactive sites. In either case, the swelling agent acts to expand the cellulose lattice and thereby expose more reactive sites with react with the crosslinking compound, thereby reducing the number of potential water absorbing sites and thus rendering the cellulose more dimensionally stable.

Not only is the dimensional stability of the cellulose materially increased, but the treatment has no effect on the oil impregnation characteristics of the pressboard and the active ingredients of the treating method will not decompose to contaminate the oil. Moreover, treatment of the cellulose with the composition of the invention acts to increase the thermal stability of the cellulose as well as increase the dielectric breakdown strength.

The following examples illustrate the treatment of cellulose pressboard with the composition of the invention and the determination of physical properties of the treated pressboard.

PREPARATION OF SAMPLES

2½ inch square samples of ⅜th inch thick Kraft pressboard were sprayed with a treating solution consisting of 25 percent dimethylolethylene urea, 50 percent N,N-dimethyl formamide, and 25 percent water. Subsequently the samples were air dried and baked in an oven at 400° F for 5 minutes to accelerate the crosslinking reaction.

DIMENSIONAL STABILITY

To determine the dimensional stability of the treated pressboard, as well as to compare the dimensional stability of the treated pressboard with untreated samples, each sample was subjected to a relative humidity of 70 percent for 14 days. This was accomplished by suspending each sample over a saturated solution of sodium carbonate in a sealed container. A total of 29 measurements were taken on each sample before and after the 14 day test period. The 29 measurements included one measurement of weight, 19 measurements of thickness and nine measurements of width. The results of the dimensional stability test were as follows:

| Sample | Control—No Treatment | | | 25% dimethylolethylene urea, 25% water, 50% N,N-dimethyl formamide soln. | |
|---|---|---|---|---|---|
| Average % increase In thickness | 18.10% | 17.32% | 1.67% | 1.92% | 0.60% |
| Average % increase In width | 0.99% | 1.46% | 0.17% | 0.21% | 0.04% |
| Average % increase In weight. | 11.46% | 14.10% | 13.70% | 14.22% | 14.01% |

From the above table it can be seen that the untreated pressboard samples showed an increase in the range of 17.32 to 18.10 percent in thickness during the period of treatment. In contrast to this the samples treated with the composition of the invention showed only an increase in thickness of 0.60 percent to 1.92 percent.

Similarly, the untreated samples shown in the Table showed an increase in width in the range of 0.99 to 1.46 percent, while the samples treated with the composition of the invention showed an increase in width of only 0.04 to 0.21 percent.

The untreated samples showed an increase in weight in the range of 11.46 to 14.51 percent and the samples treated with the composition of the invention showed a weight increase in the same range, namely 13.70 to 14.22 percent. The results listed in the Table clearly illustrate the substantial improvement in dimensional stability of cellulose material treated with the composition of the invention.

THERMAL STABILITY

To determine the thermal stability of cellulose material treated with the composition of the invention, samples of 10 mil Kraft paper were treated with a solution consisting of 25 percent dimethylolethylene urea, 50 percent N,N-dimethyl formamide and 25 percent water. The samples were air dried and then baked at 400° F for 5 minutes. Subsequently the samples were vacuum impregnated with transformer oil and aged in an oven at 150° C for 8 days. At the end of this test period, the treated samples as well as untreated control samples were tested for retension of original tensile strength on an Instron tensile testing machine with a head speed of 0.5 inch per minute.

The thermal stability tests reveal and a untreated Kraft paper impregnated and aged in transformer oil had an average tensile strength of 54.0 psi with a maximum and minimum of 60.0 psi and 47.6 psi, respectively. The specimens treated with the composition of the invention had an average tensile strength of 69.7 psi with a maximum of 82.0 psi and minimum of 56.0 psi. This represents an average increase in strength after the heat aging treatment of 29.0 percent.

DIELECTRIC BREAKDOWN STRENGTH

Test were also run to determe the dielectric breakdown strength of cellulose material treated with the composition of the invention. According to this test 10 mil samples of Kraft paper measuring 10 inches × 15 mm. were treated with the composition of the invention as outlined in the above described thermal stability test. The treated samples as well as untreated samples were tested in accordance with ASTMD-149 test procedure using 2 inch diameter electrodes having the edges rounded to ¼ inch radius. The samples were tested in new transformer oil with a voltage rise of 3,000 volts per second. The thickness of the specimens was taken at the punctures to determine volts per ml.

The results of the tests for dielectric breakdown strength indicated an increase in the dielectric strength of Kraft paper treated with the composition of the invention over the untreated samples. The average dielectric breakdown strength for the untreated Kraft paper was 2,080 volts per mil, while the average dielectric strength for Kraft paper treated with the composition of the invention was 2,213 volts per mil. This is an average increase of 133 volts per mil or 6.5 percent.

OIL CONTAMINATION

Kraft pressboard treated with the solution set forth in the thermal stability test was also submitted to an oil contamination test. After 20 hours at room temperature and 13 days at 105° C, oil samples containing treated and untreated Kraft pressboard specimens had identical readings at 40.4 dynes/cm. at 25° C for interfacial tension, 1½ NPA for color No. and 0.01 microamps for D.C. leakage.

These tests indicated that Kraft pressboard treated with the composition of the invention did not produce any contamination of the transformer oil.

We claim:

1. In an electrical power transformer wherein a cellulosic material is used as an insulator the improvement comprising, using as the insulating material a cellulose pressboard which has been impregnated with an aminoplast resin in conjunction with a cellulose swelling agent selected from the group consisting of dimethyl formamide thiourea, lower alkyl monoamines and lower alkyl diamines, and thereafter cured by heating in the absence of an acid catalyst.

2. The transformer of claim 1, wherein the swelling agent is employed in the weight ratio of 33:1 to 1:10 with respect to the aminoplast resin, based on 100 percent concentration.

3. The transformer of claims 1, wherein the combined weight of the swelling agent and aminoplast resin, based on 100 percent concentrations, comprises at least 3.7 percent by weight of the dry cellulose pressboard.

4. The transformer of claim 1, wherein the aminoplast resin is selected from the group consisting of dimethylolethylene urea, dihydroxyethylene urea; dimethylolpropylene urea; melamine-formaldehyde; urea-formaldehyde; and mixtures thereof.

* * * * *